United States Patent [19]

McSweeney

[11] 3,770,987

[45] Nov. 6, 1973

[54] EXTENDED RANGE CAPACITIVE TIMING CIRCUIT

[75] Inventor: William McSweeney, Plainfield, N.J.

[73] Assignee: Litton Business Systems, Inc., Morristown, N.J.

[22] Filed: Mar. 30, 1972

[21] Appl. No.: 239,457

[52] U.S. Cl. .................. 307/293, 307/246, 307/273

[51] Int. Cl. .......................................... H03k 17/26

[58] Field of Search ..................... 307/273, 293, 246

[56] References Cited

UNITED STATES PATENTS 3,453,453 7/1969 Hughes .............................. 307/273

OTHER PUBLICATIONS

"Coupling Network" by H. Spiro, IBM Tech. Disclosure Bulletin, Vol. 6, No. 6, November 1963, page 68.

"Close Tolerance Single Shot" by Ainscow, IBM Tech. Disclosure Bulletin, Vol. 12, No. 6, November 69, page 898–899.

*Primary Examiner*—Stanley D. Miller, Jr.
*Attorney*—Norman Friedman et al.

[57] ABSTRACT

A timing circuit includes two current sources having a constant current ratio and arranged to provide for the charge and discharge of a capacitor in response to a received input signal, operation of the circuit being independent of power supply fluctuations.

2 Claims, 5 Drawing Figures

EXTENDED RANGE CAPACITIVE TIMING CIRCUIT

This invention relates to timing circuits, and more particularly, to a self-clocking record sensing system including an improved timing circuit for deriving a clock signal from an information data signal output of a transducer device to provide the proper sampling times for decoding the data signal.

In a record sensing system of the type, for example, disclosed in co-pending application Ser. No. 115,044 entitled SELF-CLOCKING RECORD SENSING SYSTEM, there is described a system wherein the time of sensing of the individual signals of a variable frequency signal train may be adjusted for each successive signal in dependence upon the time relationships between previous signals of said train.

More particularly, in the aforesaid record sensing system a handheld transducer is manually caused to scan a magnetically encoded label or tag containing an information data track. As the transducer sweeps across the label, it senses the magnetization direction of the information bits recorded thereon and produces a corresponding output signal which is then fed to an associate electronics unit for decoding and further processing of the retrieved data. Circuitry is included in the electronics unit which operates to derive a data synchronous clock directly from the incoming data, thereby avoiding the need for a separate clock track on the label. However, since the transducer device is handheld, it has been found that the rate of sweep of the transducer by an operator may vary during the course of travel over a label, i.e., the relative velocity between label and transducer will tend to vary as the transducer is swept across the label. Accordingly, the electronics unit includes timing circuitry which senses the time interval from data bit to data bit and adjusts the synchronous timing signal or clock as a function of the previous time interval of a transduced data signal.

In the timing circuitry there is included a pair of capacitors which are alternately charged by incoming signals derived from the slope detector transduced data signals so as to provide the measuring time for the signal sampling intervals. Each capacitor is associated with a separate timer forming part of the timing circuitry. The output signals from the separate timers are so spaced as to provide a period of time within which a clock signal is produced synchronous with the variable frequency data signal to be sampled. It has been found that in prior art designs of timers utilizing constant current sources in the capacitor charge path, fluctuations in the circuit operating potentials have resulted in stringent limitations on the low and high range operating limits of the timing circuitry, i.e., the relative sweep rate between the scanning transducer and encoded data record for which a synchronized clock pulse is to be derived.

Accordingly it is an object of the present invention to provide an improved timing circuit wherein the low speed of operation of the circuit is substantially independent of the circuit operating potential.

It is another object of the invention to provide an improved timing circuit wherein both the low and high speed limitations on the operation thereof are substantially extended over heretofore known designs.

A timing circuit embodying the invention includes a capacitor, a pair of switching devices coupled to said capacitor so as to provide for the charge and discharge thereof in response to a received signal, and a pair of current sources respectively coupled to said switching devices. Each of said current sources includes a transistor operatively connected between a source of operating potential and the respective switching device. Means including a voltage divider resistor network are provided for biasing each of said transistors such that the ratio of the output currents therefrom is substantially constant.

The novel features which are considered characteristic of the present invention are set forth with particularity in the appended claims.

The invention itself, however, both as to its organization and method of operation, as well as additional objects thereof, will be understood from the following description when read in connection with the accompanying drawing wherein.

Figure 1:
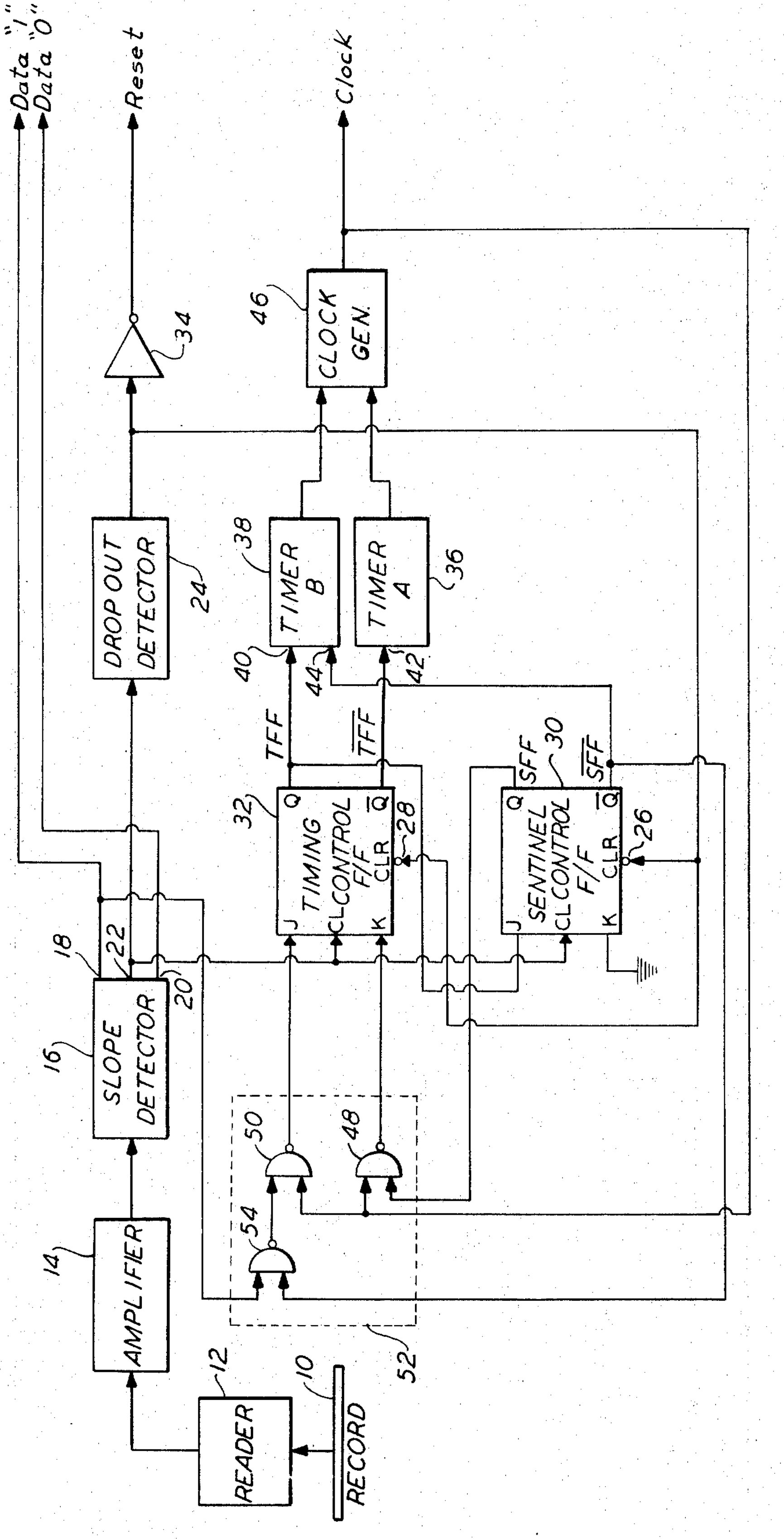
FIG. 1 is a block diagram of a record sensing system including the timing circuitry of the present invention.
Figure 2:
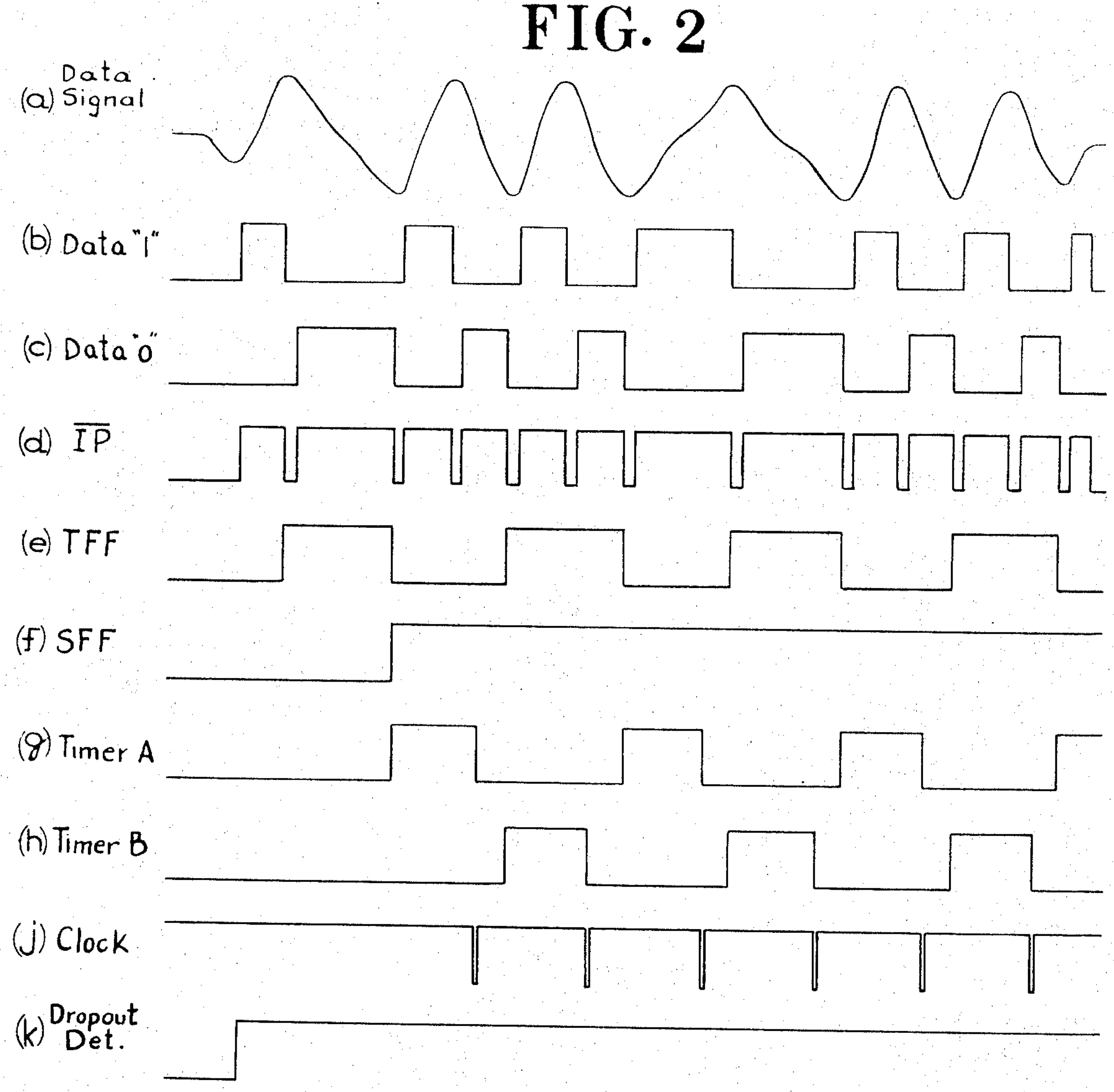
FIG. 2 ($a$ – $k$) are potential waveform diagrams showng the relative timing signals at various outputs in the system diagram of FIG. 1.

Referring first to FIG. 1 of the drawings, there is illustrated in block form a simplified diagram of a record sensing system including the timing circuitry of the present invention. A waveform diagram showing the relative timing of the signals appearing at the outpoints in FIG. 1 is illustrated in FIG. 2. Assuming, in this example, that information data is encoded on a magnetic record 10 using phase modulation recording, i.e., where a data 1 and a data 0 are each associated with a phase reversal of the recording current, than a data 1 signal bit may correspond to a negative to positive transition in the middle of a data cell or wave cycle, and a data 0 will correspond to a positive to negative transition in the middle of the data cell. In the illustrated system, the first two bits of every transduced message are termed the "start" bits whose period provides initial timing information for the clock generating circuits to be hereinafter described.

A transducer 12 is arranged to scan the magnetically encoded data record or label 10. The signal output from the transducer 12 is coupled through an amplifier 14 to a positive and negative slope detector circuit 16. The slope detector 16 operates, for example, to provide at one output terminal 18 a high level data input signal in response to a negative to positive phase transition of the input signal, signifying a data 1 bit, and at a second output terminal 20, a high level output signal in response to a positive to negative phase transition of the input signal, signifying a data 0 information bit.

At a third output terminal 22 of the slope detector 16, a pulse signal, herein designated as the $\overline{IP}$ signal is provided in response to the detection of either a data 1 or data 0 information bit. The $\overline{IP}$ signal may be derived, for example by coupling the outputs at terminals 18 and 20 through an OR gate which may be included in the slope detector 18 to the input of a drop out detector 24 which operates to generate a signal indication when data, i.e., the $\overline{IP}$ pulse signal, is at a low level for more than a specified period of time. In the illustrated system of FIG. 1 it will be assumed that the output of the detector 24 wll be high in the presence of a data or $\overline{IP}$ signal. The detector 24 output is coupled to the "clear" input terminals 26 and 28 of two J-K flip-flop circuits designated respectively as the sentinal control 30 and the timing control 32, and also through an inverter 34 so as to provide a high level reset signal output in the absence of data.

The sentinel control 30 operates to detect the "start" bits which signify the beginning of a data message. Thereafter the timing control 32 will alternate states on successive data bits.

Two separate timing circuits indicated as A timer 36 and B timer 38 are provided. The Q terminal output of the timing control J-K flip-flop 32 is coupled to an input 40 of the timer 38 and the $\overline{Q}$ terminal output of flip-flop 32 is coupled to an input 42 of the timer 36 for respectively controlling said timers as will be hereinafter described. A connection is also made from the $\overline{Q}$ output of the sentinel control flip-flop 30 to a second input 44 to the timer 38. The Q terminal output of the timing control flip-flop 32 is also coupled to the J terminal input of the sentinel control 30 to provide for the setting of the sentinel flip-flop once the start bits of an incoming message have been received.

A clock generator 46 is responsive to the negative going edges of the output pulse signals derived from the timers 36 and 38 and operates to provide a clock output signal to synchronize the sampling of the transduced data in accordance with variations in the sweep rate during the scan of a magnetic record as well as to provide a data strobe for external peripherals associated with the record sensing system and not herein described.

The clock generator output is also coupled back to the respective first inputs of first and second NAND gates 48 and 50 and forming part of logic control circuit indicated by the dashed rectangle 52 so as to provide for further control of the timer circuits 36 and 38 as will hereinafter be described. A third NAND gate 54 in the logic control circuit 52 has a first input coupled thereto from the data 1 output terminal 18 of the slope detector 16 and a second input coupled from the Q terminal output of the sentinel control 30. The output of NAND gate 54 is coupled to the second input of NAND gate 50 and the output from the $\overline{Q}$ terminal in the sentinel control flip-flop 30 is coupled to the second input of NAND gate 48. The signal outputs from the control logic 52 and more particularly from the NAND gates 50 and 48 are respectively coupled to the J and K terminal inputs of the timing control flip-flop 32. Clocking of the flip-flop circuits 30 and 32 is provided by a circuit path coupling from the $\overline{IP}$ signal output terminal 22 of the slope detector 16 to the respective clock terminal inputs of the control circuits 30 and 32.

Briefly described, the record sensing system operates as follows.

It will be assumed that initially no data is being received and the Q outputs of the timing control 32 and sentinel detector control 30 are low or zero, the flip-flops having been cleared by a prior low level signal coupled from the drop out detector 24 in the absence of received data. Assume also a sentinel "start" code of a data 1 followed by a data 0. As will be seen, it is upon the sensing of this sentinel pattern that the system begins to function. The necessity for the two sentinel signals, in addition to indicating the starting position of a record data message on the record 10, is to establish an original sampling interval for the sampling of the first data signal to follow.

Upon detection of the first sentinel bit, i.e., a data 1 (FIG. 2, line *b*) the output of the drop out detector wIll go high causing removal of the clear signal coupled to the control circuits 30 and 32. The operation of the logic circuitry included within the block 52 is such that upon the detection of a data 1 bit at the output terminal 18 of the slope detector 16, the J input of the timing control 32 is enabled. Thereafter, the timing control is clocked by the $\overline{IP}$ signal (FIG. 2, line *d*) coupled from terminal 22 of the detector 16, the Q output, hereinafter referred to as the TFF signal (FIG. 2, line *e*), of the timing control 32 goes high and thus the $\overline{Q}$ output ($\overline{TFF}$) goes low or to zero.

AS will hereinafter be described, the circuitry of the A and B timers 36 and 38 is such that the application of a low level or 0 input signal will initiate the charging of an associated timing capacitor. Thus, with the $\overline{Q}$ output of the timing control 32 ($\overline{TFF}$) in a low state, the A timer 36 will begin to charge. The high output of the timing control 32 now enables the J input of the sentinel control 30. Also, the K input of the timing control 32 is enabled because the sentinel control is still in a reset condition.

Upon the detection of the next sentinel bit and the resultant generation of another $\overline{IP}$ pulse at the output 32 of the slope detector 16, both control flip-flops are clocked causing the Q output (SFF) of the sentinel control to go high, and the Q output (TFF) of the timing control to go low. Thus, the $\overline{Q}$ output ($\overline{TFF}$) of the timing control goes high cutting off the charge initiating signal to timer A which will then proceed to discharge its associated capacitor. At the same time, the Q output of the timing control 32 goes low and causes the capacitor associated with the B timer 38 to now charge. The $\overline{Q}$ output of the sentinel control goes low and remains in this condition while data information continues to be received.

Thus, while the A is measuring the width of a presently received data bit, the B timer is predicting when to sample this bit based on its measurement of the width of a previously received data bit. During the next bit time the B timer will measure the width of the present data bit while the A timer will cause the sample pulse (clock) to be generated. The clock pulse may, for example, be approximately 150 nanoseconds wide and is produced by the clock generator in response to the negative going edge of the output from each of the timers coupled thereto. Generation of this clock pulse will occur every time an interval $t_2$ that may nominally be equal to 75 percent of the previous bit time $t_1$ (FIG. 2, lines g and h). The clock pulse output is used to enable the J and K inputs of the timing control flip-flop 32 and to indicate to the peripheral logic circuitry (not herein shown) when the output should be sampled. The timing control flip-flop toggles or changes state on the next $\overline{IP}$ signal received from the slope detector 16. After the J and K inputs of the timing control have been enabled by the clock pulse (FIG. 2, lines *d, e* and *j*). The sentinel control flip-flop is initially in the reset state and is used to inhibit operation of the B timer until the first data bit has been received . This insures that the A timer will measure the time interval of the first data bit and the time interval of all subsequent odd data bits while the B timer will measure the time interval of all the even data bits. The sentinel control flip-flop is set at the end of the first data bit and is not reset until the end of the message.

It will thus be seen that the function of the sentinel control flip-flop is to allow the first data 1 bit of an incoming message to set the timing control flip-flop. This function is accomplished when the sentinel flip-flop is in the reset state (SFF= 0). While in the reset state the sentinel detector is also used to inhibit the B timer 38 until receipt of the sentinel bits. Once this has occurred, the sentinel control flip-flop 30 is set and remains set for the duration of the message. Thereafter, the clock generator output signal (FIG. 2, line j) is used to enable the timing control flip-flop which is then caused to toggle on the receipt of the subsequent $\overline{IP}$ pulse. In this manner, the A and B timers, which are substantially identical in design alternately measure the time interval between data bits.

Figure 3:
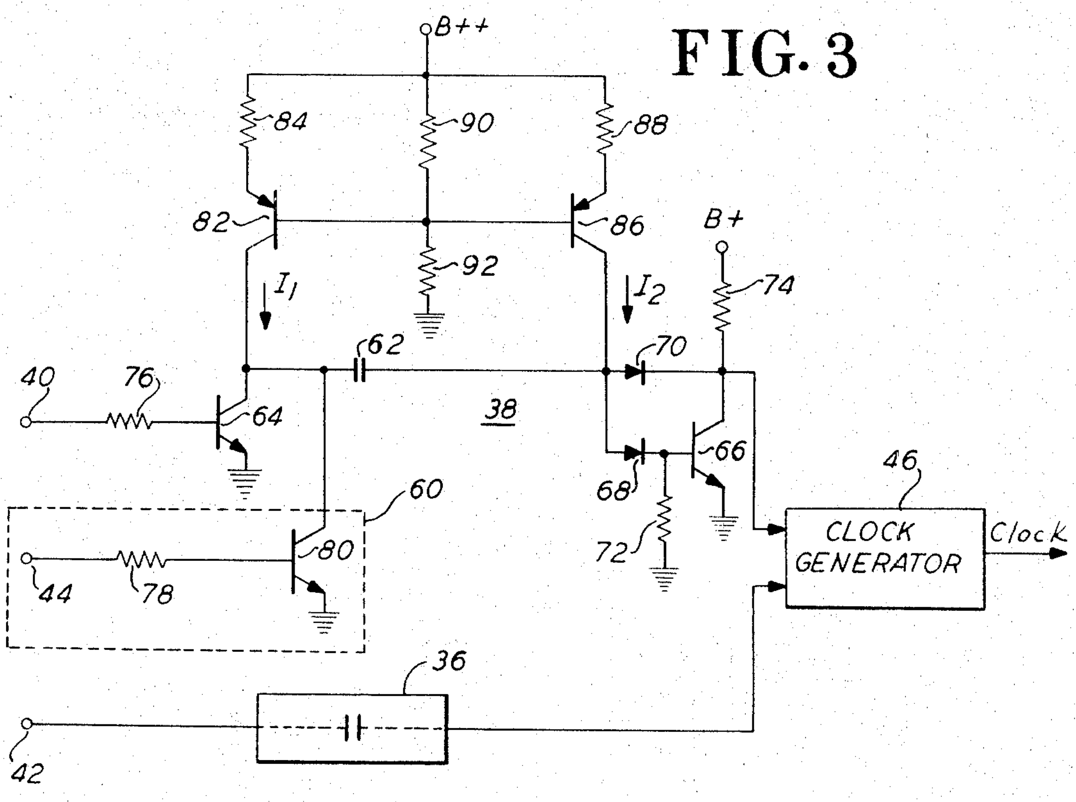
FIG. 3 is a schematic diagram of the timing circuitry of FIG. 1 in accordance with the present invention.

Turning now to FIG. 3, there is shown a more detailed diagram of the timing circuitry of the present invention. As the timers 36 and 38 are substantially identical in design, only one, the B timer, is illustrated schematically while the A timer 36 is represented in block form. Note, additional input circuitry to the B timer to inhibit charging of timer B prior to the start of a message is shown within the dashed rectangle 60 and is not considered part of the general circuitry of the timer 38 or the timer 36. The outputs from both the timers 36 and 38 are shown as coupled to the inputs of the clock generator 46.

To allow for the charge and discharge of a timing capacitor 62, a pair of NPN transistors 64 and 66 are provided. The transistors 64 and 66 are connected in a grounded emitter configuration and are suitably biased to operate as switches, the switching action being responsive to the presence or absence of a signal coupled to the base electrodes of the transistors 64 and 66 as will hereinafter be described.

The collector electrode of the transistor 64 is coupled via the capacitor 62 to the anode of a diode 68, the cathode of said diode being connected to the base electrode of the transistor 66. A second diode 70 is connected between the capacitor 62 and the collector electrode of the transistor 66. A resistor 72 is connected from the base of the transistor 66 to a point of reference potential or ground. The collector electrode of the transistor 66 is connected via a resistor 74 to a source of operating potential indicated in the drawing as B+. A signal output terminal for the timer 38 is provided at the collector electrode of the transistor 66 and is coupled to a first input of the clock generator 46. As was noted before, the second input to the clock generator 46 is coupled from the output of the A timer illustrated in the drawing as block 36. A singal input to the timing circuit 38 is coupled from the Q output of the timing control flip-flop 38 via a resistor 76 connected to the base electrode of the transistor 64. In the B timer only, an additional input is provided via the inhibit circuit 60. The inhibit circuit includes a resistor 78 connected between the second input terminal 44 and the base of a transistor 80 having its collector electrode directly connected to the junction of the capacitor 62 and the collector electrode of the transistor 64. With a high signal $\overline{SFF}$ coupled from the $\overline{Q}$ output of the sentinel control flip-flop 30, the transistor 80 is turned on so as to provide a low impedence path therethrough thereby effectively clamping the capacitor 62 to ground potential and thus preventing the capacitor from being charged prior to the detection of the sentinel bits. It will be noted that once the sentinel bits have been detected, $\overline{SFF}$ goes low and remains there for the duration of the message. The transistor 80 is thus turned off and effectively open-circuited from the capacitor 62.

In accordance with the present invention, two current sources having a fixed current ratio are provided to effect the charge and discharge of the timing capacitor 62 via a switched circuit path coupling through the transistor 64 and 66. More particularly, a first source which is associated with the transistor 64 will be seen to include a PNP transistor 82, the collector electrode of which is directly connected to the collector electrode of the transistor 64. The emitter electrode of the transistor 82 is coupled via voltage dropping resistor 84 to a second source of operating potential for the timing circuit indicated in the drawing as B++. A second current source associated with the transistor 66 includes a PNP transistor 86 having its collector electrode directly connected to the junction of the capacitor 62 and the diodes 68 and 70. The emitter electrode of the transistor 86 is coupled via a voltage dropping resistor 88 to the source of operating potential B++. To provide a bias on the transistors 82 and 86, the base electrodes of the transistors are coupled to the junction of voltage divider resistors 90 and 92 connected between the source of operating potential B++ and ground.

Figure 4:
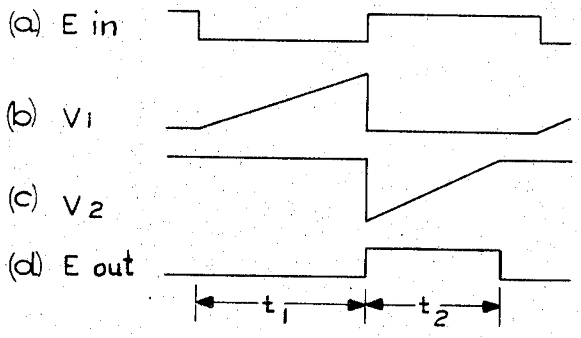
FIGS. 4 and 5 are potential waveform diagrams showing the relative timing at points in the circuit of FIG. 3 during the charge and discharge of one of the timing capacitors.

The operation of the timing circuit will first be described with reference to the idealized waveform diagrams shown in FIG. 4 and assuming that the transistors 82 and 86 are biased to operate as constant current sources delivering currents $I_1$ and $I_2$ of relatively fixed values.

During the time interval $t_1$, the TFF signal input ($E_{in}$) to the terminal 40 of the B timer, for example, is low and the input transistor 64 is biased off. The capacitor 62 is charged by the current $I_1$ flowing through the first current source transistor 82.

The output transistor 66 is initially biased on during the time interval $t_1$ and consequently its collector output voltage is low. At the termination of the time interval $t_1$, the TFF input signal goes high and turns the transistor 64 thereby producing a negative change in the voltage $V_1$ at the collector electrode and bringing it down to the saturation voltage of the transistor 64. This negative change in collector voltage is coupled through the capacitor 62 and the diode 68 to the base of the output transistor 66 and turns the transistor off.

With the output transistor 66 reversed biased into its off state, and the input transistor 64 turned on, the capacitor 62 will now be charged in the opposite direction by the current $I_2$ flowing through the second current source transistor 86. Stated another way, the capacitor 62 will in effect discharge at a rate controlled by the collector current $I_2$ of the second current source transistor 86 and through the turned on transistor 64 until after a time $t_2$ it reaches the turn on voltage $V_2$ of the transistor 66. At this point the transistor 66 will again conduct causing its collector voltage to go low. During this sequence, the collector output voltage $E_{out}$ of the transistor 66 is a pulse having a pulse width equal to $t_2$ and which is coupled to the clock generator 46. The input waveform signal $E_{in}$ from the timing control is shown at line ($a$) of FIG. 4. The voltage $V_1$ on the collector electrode of the transistor 64 and the charge on the capacitor 62 during the time intervals $t_1$ and $t_2$ is shown at line ($b$) of the figure. The voltage $V_2$ appearing at the junction of the capacitor 62 and the diode 68 is shown at line (c) of FIG. 4; and the collector output voltage of the transistor 66 is shown at line ($d$).

From an analysis of the equations and waveform diagrams associated with the charge and discharge circuit just described, it can be shown that the output pulse width $t_2$ is independent of the capacitor value and directly proportional to the input pulse width $t_1$. It will be remembered of course that the pulse width $t_1$ is determined by the TFF ($E_{in}$) signal input from the timing flip-flop circuit 32.

As has been noted, the function of the timing circuit as described above is to produce an output signal ($E_{out}$) for coupling to the clock generator 46. The output signal has a pulse width ($t_2$) proportional to the pulse width ($t_1$) of the preceding input voltage signal TFF coupled from the timing control flip-flop. Due to the changes in the rate of scan of the transducer over the magnetic record during the operation of the system, it is desirable that the ratio $t_2/t_1$ remain constant while the absolute value of $t_1$ may vary by a factor of as much as twenty to one. This ratio $t_2/t_1$ should also remain stable with respect to component parameter variations and power supply fluctuations.

The low speed sweep rate of the record sensing system is determined by the low frequency limit of the timing circuit. This in turn is determined by the saturation voltage of the current source transistor 82 and this saturation point is set by the voltage level at the base electrode of the transistor 82. When transistor 82 becomes saturated, the voltage across the capacitor 62 no longer increases during the charge time $t_1$ and the circuit ceases to time properly.

In conventional current source arrangements using a Zener diode in the base bias circuit and wherein the Zener is connected between the base electrode of the two current source transistors and the source B++ operating potential and a voltage dropping resister is connected between the transistor bases and ground, the voltage at the base electrodes tends to follow the supply voltage. Thus, while the current $I_1$ and $I_2$ will tend to remain constant as the B++ operating potential decreases due to the fluctuations therein, the voltage at the base electrodes of the transistors will decrease by the same amount as the B++ voltage.

In order to optimize the reading range of the system the base voltage of the current source transistor 82, should be a large percentage of the operating potential voltage B++, but still must be small enough to make the current ratio $I_2/I_1$ relatively insensitive to variations in the base emitter voltage of the current source transistor 82. The transistor 82 will therefore saturate in a shorter time interval ($t$) thus raising the low speed failure point of the timing circuit. In other words, the saturation time of the current source transistor will determine the maximum charge time ($t_1$) for the capacitor 62 and this will be affected by fluctuations in the supply voltage B++.

In accordance with the present invention, base bias of the current source transistors 82 and 86 is provided by a voltage divider network comprising the resistors 90 and 92 connected between the source of operating potential B++ and ground. This bias arrangement has the effect of making the low speed limit of the timing circuit independent of changes in the circuit operating potential B++. From an inspection of the circuit, it will be seen that now as the operating potential B++ decreases, the current $I_1$ and $I_2$ will decrease by the same percentage as the base voltage potential coupled from the junction of the divider resistor 90 and 92. Consequently, the time it takes to saturate the current source transistor 82 remains substantially constant.

The maximum or high speed sweep rate of the record sensing system is influenced by the high frequency limit of the timing circuit. The factors that determine the high speed limit of the timing circuit will now be examined with respect to FIG. 5 wherein the idealized waveform diagram of FIG. 4 has been redrawn to show the practical effect of the switching operation of the transistors 64 and 66 during the charge and discharge of the capacitor 62.

Figure 5:
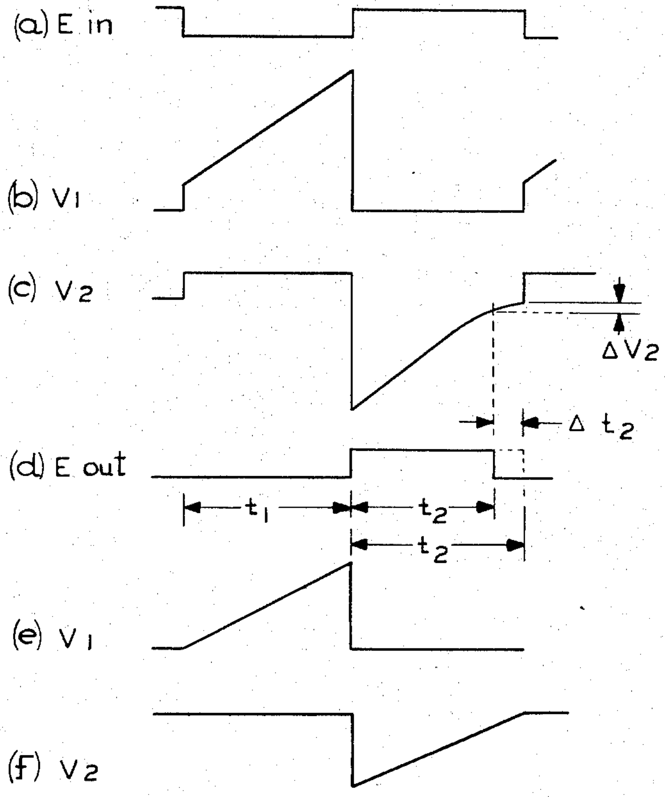

Referring again to the timing circuit shown in FIG. 3 together with the waveform diagram of FIG. 5 it will be understood that the high speed limit of the timing circuit may be considered as a function of the gradual decrease in the ratio of the discharge and charge times $t_2/t_1$ of the capacitor 62 as the reading speed of the transducer device over the data encoded record is increased. The primary cause of this decrease in the $t_2/t_1$ ratio has been found to be due to small changes or fluctuations in $V_2$, i.e., the voltage appearing at the junction of the capacitor 62 and the diode 68, and in fluctuations in $V_1$ at the collector to emitter saturation point of the first switching transistor 64. It has also been found that the change in the voltage $V_2$ is caused by the capacitor 62 continuing to charge at a relatively slow rate (asymptotically as shown in the waveform diagram on line $c$, FIG. 5) after the output transistor 66 has been turned on.

In accordance with another feature of the present invention the high speed limit of the timing circuit herein described has been increased by the inclusion of a current steering diode 70 connected as shown in the drawing as between the collector electrode of the output transistor 66 and the junction of the capacitor 62 and the diode 68. Normally, the current $I_2$ would be directed to the base of the transistor 66 during charging of the capacitor 62. However, the diode 70 functions to direct a large percentage (i.e., greater than 90 percent) of the current $I_2$ to the collector electrode of the output transistor 66 thereby minimizing the change ($\alpha V_2$) in the voltage $V_2$ at the junction of the capacitor 62 and diodes 68 and 70 with a resultant minimization in any change in the ratio $t_2/t_1$ due to the continued charge of the capacitor 62 after turn on of the transistor 66 as was noted above. The effect of this diode on the voltages $V_1$ and $V_2$ is shown on lines $e$ and $f$ respectively in FIG. 5. It will be seen that the "step" in waveforms $V_1$ and $V_2$ (FIG. 5, lines $b$ and $c$) has been substantially eliminated and that the discharge time of the capacitor has been extended to $t_2'$. The ratio $t_2/t_1$ has thus been held substantially constant and insensitive to changes in reading speed in the transducer during the scanning of a record. It will thus be seen that by the inclusion of the steering diode 70 as above described the continued charging of the capacitor 62 after turn-on of the output transistor 66 can be minimized and thus the high speed limit of the timing circuit extended.

Accordingly, as herein described, there has been provided an improved timing circuit wherein the low and high speed limits of the circuit have been substantially independent of the circuit operating potentials.

I claim:

1. A timing circuit comprising:

a capacitor;

first and second switching means for respectively providing a circuit path coupling for the charge and discharge of said capacitor;

first and second current sources respectively coupled to said first and second switching means, each of said sources including a semiconductor device coupled between a source of operating potential and the respective switching means;

said second switching means including a transistor having base, emitter and collector electrodes connected in grounded emitter configuration;

said first and second current source semi-conductor devices being transistors respectively providing a collector to emitter current path between said first and second switching means and said operating potential source;

resistive means for biasing said semi-conductor devices such that the ratio of the output currents respectively provided by said current sources is substantially constant and independent of fluctuations in said operating potential;

said biasing means including a pair of resistors series connected between said potential source and a point of reference potential, the junction of said resistors being connected to the base electrodes of said current source transistors;

a first diode connected between the collector electrode of said second current source transistor and the base electrode of said switching means transistor; and a second diode connected between the collector electrode of said second current source transistor and the collector electrode of said switching means transistor, said diodes being poled to provide a direct current conducting path to said second switching means transistor.

2. A timing circuit comprising:

first and second transistors, each connected in a ground emitter configuration and biased to alternately operate as switches in response to an input signal applied to said first transistor;

means including a capacitor coupled between the output of said first transistor and the input to said second transistor, the switching operation of said transistors being such as to alternately provide a path for charge and discharge respectively of said capacitor;

means providing a source of operating potential;

first and second current sources each including a transistor providing an emitter to collector current path coupling respectively to the collector electrode of said first switching transistor and the base electrode of said second switching transistor; and biasing means including first and second resistors series connected between said operating potential source and a point of reference potential, the series junction of said resistors being coupled to the base electrodes of said current source transistors, said capacitor coupling means including a first diode coupled between the collector electrode of said second current source transistor and the base electrode of said second switching transistor, and a second diode coupled between the collector electrode of said second current source transistor and the collector electrode of said second switching transistor, said diodes being poled so as to provide a direct current conducting path to said second switching transistor.

* * * * *